United States Patent [19]
Brient

[11] Patent Number: 5,705,074
[45] Date of Patent: Jan. 6, 1998

[54] REMOVAL OF ACIDIC ORGANIC CONTAMINANTS FROM REFINERY WASTE WATER

[75] Inventor: James A. Brient, Missouri City, Tex.

[73] Assignee: Merichem Company, Houston, Tex.

[21] Appl. No.: 752,058

[22] Filed: Nov. 19, 1996

[51] Int. Cl.⁶ ............................................ B01D 11/00
[52] U.S. Cl. ..................... 210/634; 210/639; 210/708; 210/805; 210/806; 210/511; 210/909
[58] Field of Search .................... 208/236, 270, 208/289; 585/860; 210/634, 805, 806, 195.1, 511, 909, 708, 639

[56] References Cited

U.S. PATENT DOCUMENTS

| | | | |
|---|---|---|---|
| 3,758,404 | 9/1973 | Clonts | 208/263 |
| 3,977,829 | 8/1976 | Clonts | 208/263 |
| 3,992,156 | 11/1976 | Clonts | 23/267 |
| 4,666,689 | 5/1987 | Maple et al. | 423/183 |
| 4,675,100 | 6/1987 | Maple et al. | 208/203 |
| 4,746,494 | 5/1988 | Maple et al. | 422/189 |
| 4,753,722 | 6/1988 | Le et al. | 208/207 |
| 4,842,715 | 6/1989 | Paspek | 210/634 |
| 5,154,831 | 10/1992 | Darian | 210/634 |
| 5,271,841 | 12/1993 | Hart | 210/634 |
| 5,328,615 | 7/1994 | Pacheco | 210/634 |
| 5,413,717 | 5/1995 | Webster | 210/634 |
| 5,518,621 | 5/1996 | Holcombe | 210/634 |

OTHER PUBLICATIONS

Wang, Extraction of Phenol by Sulfuric Acid Salts Trioctylamine, *Journal of the Chinese Institute of Engineers*, vol. 18, No. 4, pp. 545–552 (1995).

*Primary Examiner*—Ernest G. Therkorn
*Attorney, Agent, or Firm*—Jenkens & Gilchrist, P.C.

[57] ABSTRACT

A process is described whereby phenolics and other water soluble, organic materials are removed from certain aqueous refinery waste streams by an extraction process whereby the brine is contacted with a hydrocarbon solvent containing at least about 2% by weight of a trialkylamine.

7 Claims, 2 Drawing Sheets

5,705,074

REMOVAL OF ACIDIC ORGANIC CONTAMINANTS FROM REFINERY WASTE WATER

FIELD OF THE INVENTION

This invention relates to the removal of organic contaminants, specifically phenols and organic sulfonic acids which create a high chemical oxygen demand in brine waste waters resulting from the recovery of hydrocarbons at refineries.

BACKGROUND OF THE INVENTION

In the process of squeezing every valuable stream from a barrel of crude oil, aqueous refinery waste streams are treated with an acid, usually sulfuric acid, to "spring" organic acids from the refinery waste. In the course of this recovery process a waste water brine is created which is high in phenolic content and chemical oxygen demand above that which is environmentally acceptable for surface disposal. These brines often exceed the disposal limits for phenolic compounds and chemical oxygen demand (COD), which may be discharged into the environment. The alternative is to either incinerate or store the materials, both of which are unacceptable costly alternatives.

The brines being treated may typically contain from 600 to 3000 parts per million (ppm) phenolics and, not uncommonly, more that 20,000 ppm COD.

Although there are many alternative technologies available to remove phenolics from brine, including, for example, partial evaporation of water, adsorption, oxidation and solvent extraction, which has proved to be the most feasible process, still a single stage extraction with a hydrocarbon solvent may remove 40 to 50% phenolics, at best, while the COD remains substantially untouched. A study conducted to improve on the solvent extraction of a phenol from such a sulfate brine stream is described, for example, in the article "Extraction of Phenol by Sulfuric Acid Salts of Trioctylamine", Maw-Ling Wang and Kwang-Hun Hu, Department of Chemical Engineering, National Tsing Hua University, Taiwan, *Journal of the Chinese Institute of Engineers*, Vol. 18, No. 4, Pgs. 545–552 (1995). Trioctylamine is added to a solvent system and the extraction of the phenolics from the brine is performed. Some significant improvement occurs in the prior art discussion of the use of the trioctylamine (TOA)—diluent solution through formation of an amine sulfate in the solvent. Relatively small amounts of TOA, added to various solvents, were found to increase the phenol distribution coefficients, in some instances significantly. The publication falls, however, to deal with, or even recognize, the problem of reducing COD with such an extraction process. The mixtures desired and treated were synthesized rather than emerging from a refinery operation.

Thus, a process is needed which will operate at mild conditions, extract not only phenolic compounds from brine, but also reduce the chemical oxygen demand of the waste refinery brine, while at the same time only result in slight loss in extractant agent or solvent. While the foregoing addition of the tertiary amine to the extraction solvent is an improvement, much is left desired with respect to the need to remove the COD.

Accordingly, it is an object of this invention to provide a process whereby removal of phenolics and COD is sufficiently complete and efficient to allow for the environmentally safe disposal of the aqueous refinery waste and provide sufficient recovery of the organic values from the waste stream.

SUMMARY OF THE INVENTION

The above objects of this invention are accomplished by contacting an aqueous refinery waste stream containing phenolic compounds and a high chemical oxygen demand in the form of water soluble organic materials, usually in the form of organic sulfonic acids resulting from the acid springing of sodium salts from the aqueous refinery effluent with sulfuric acid. This result is accomplished by contacting the aqueous refinery waste stream with a hydrocarbon solvent containing at least about 1% tertiary alkylamines in an acid condition at a pH of less than or about 4, preferably between 2 and 4. The contact would occur at a ratio of from about 2 to about 10 parts of the aqueous waste stream, or brine, per part of the solvent solution, preferably from 3 to 6 parts brine per part solvent. Contact may be made at ambient or elevatet temperatures, preferably up to about 150° F. Conveniently, the temperature of treatment is about the same temperature at which the waste stream exits the springing step. Of course, if the waste stream comes from a storage tank it may be treated at the ambient temperature of the storage. Ambient pressures are satisfactory and contact time is much less important than the degree of mixing between the solvent and the brine. Sufficient contact time to accomplish the extraction is easily determined by routine experimentation.

Mixing would preferably occur for some brine solutions in a static, in-line, mixer. However, to achieve the optimum performance of the system, contact over a fiber bundle is preferable.

Once contact between the aqueous brine and organic solvent containing the tertiary amine has occurred, the aqueous phase and the solvent phase are allowed to separate. Extraction has been sufficient at this point in time to allow disposal of the aqueous phase to the environment with a minimum of treating, such as that which would occur in a municipal waste treatment plant. The solvent containing the amine and the organic materials extracted from the aqueous stream can then be contacted with an alkali metal hydroxide, usually sodium hydroxide, again preferably over a fiber bundle contact system to create the sodium salt of the phenol or the organic sulfonate removed from the waste stream and regenerate the solvent/amine extraction stream. This salt stream would then be neutralized with sulfuric acid to produce a sodium sulfate aqueous phase and a organic acid/phenol phase which could then be separated and recovered. The solvent and amine, thus freed from the phenols and organic material extracted from the waste stream, could then be recycled to take part in the extraction step once again. The loss of amine in the practice of this process is very small.

DETAILED DESCRIPTION OF THE INVENTION

The present invention provides a method for treating an aqueous refinery effluent, or brine, containing phenolic compounds and other water soluble organics, such as, for example, organic sulfonic acids, to recover the values from the waste stream and to render the waste acceptable for environmental disposal. The refinery effluent containing the phenolic compounds will normally also contain sulfur salts and be at a low pH, i.e., a pH of less than to about 4, resulting from the treatment with sulfuric acid to "spring" the cresylic and naphthenic acids from a caustic refinery stream. The brine thus produced would exit the springing step and enter the recovery process of this invention. This "springing" step is well known to those skilled in the art and has long been practiced in refinery processes.

Figure 1:
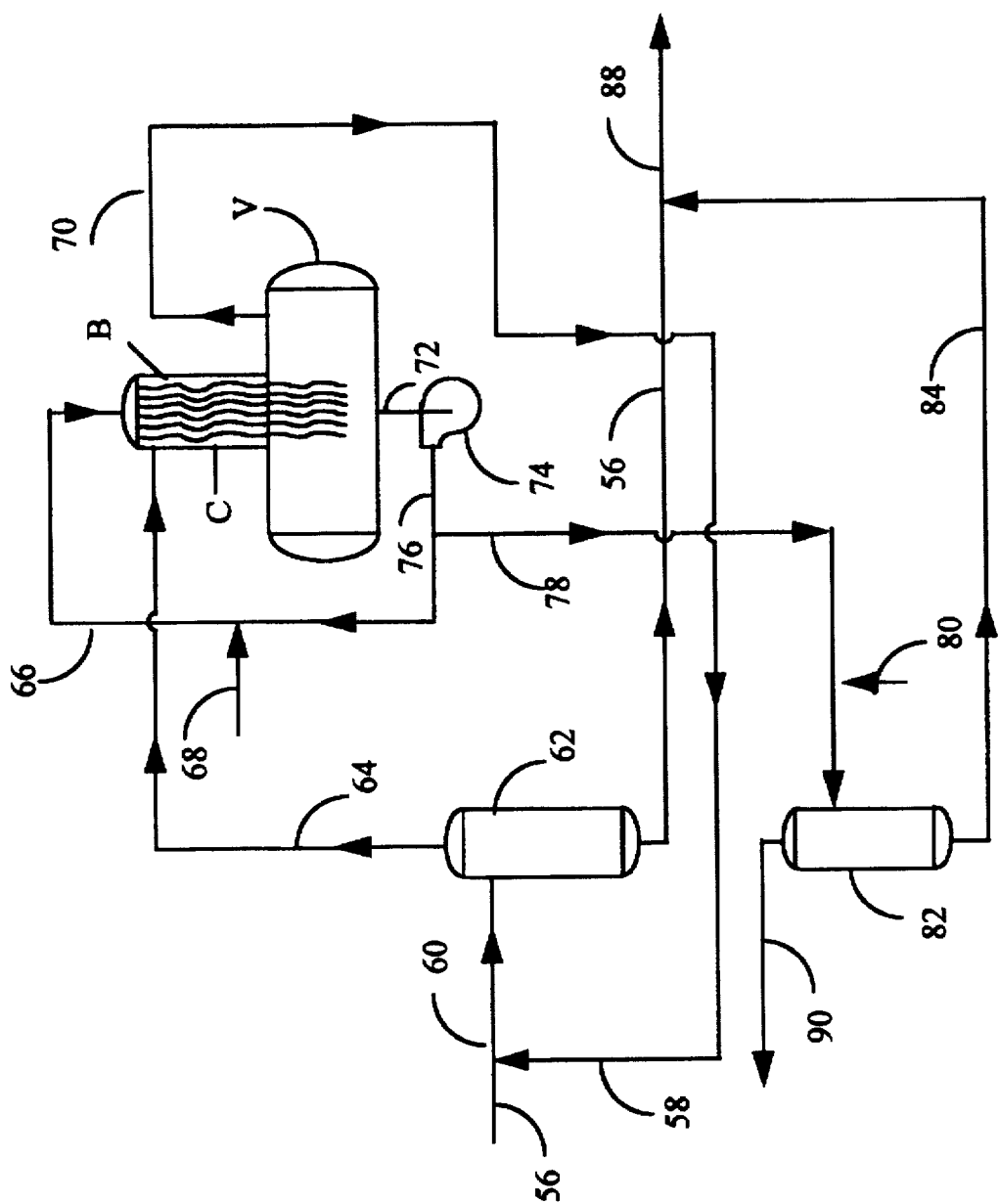
FIG. 1 shows a schematic diagram of the process of this invention, including the springing step for recovery of the naphthenic acids.

The process of this invention will further be illustrated by viewing FIG. 1, wherein the aqueous effluent brine exiting the springing step through line 56 and becomes the feedstream for the instant invention. The aqueous brine in line 56 contains the phenols and other soluble organic compounds. The concentration of the phenolic compounds in such a stream may have a concentration of about 1,200 ppm (by weight) or possibly even higher; one source, greater than 2500 ppm. The chemical oxygen demand of some such streams may be as high as 25,000 ppm. Because of its source, normally from the acid springing unit, it will have a pH of about 2 or lower, quite acid. It is discovered that the practice of this invention thrives on the acidic condition of the aqueous brine. The chemical oxygen demand receives some contribution, of course, from the presence of the phenolics, but other water soluble organic compounds, usually in the form of organic sulfonic acids also contribute to the difficulty of the disposal of the waste.

The fiber film contactors used in the practice of this invention have been described in various embodiments, for example, in U.S. Pat. Nos. 3,758,404, 3,992,156, 4,666,689, 4,675,100 and 4,753,722, all of which are incorporated herein by reference for all purposes. From these references, one of ordinary skill in this art would readily be able to apply this particular unit operation where necessary.

The acidic stream leaving the springing step through line 56 is contacted with a solvent entering through line 58. This solvent is preferably an organic material having little water solubility and a high flash point to enhance the safety of its use. Several solvents have been found to be satisfactory for the extraction of phenolics from the aqueous brine waste stream such as, for example, iso-decanol, a mineral distillate hydrocarbon, kerosene, di-isobutyl ketone or certain alkyl benzene solvents, to name a few. However, a middle distillate hydrocarbon cut has been found to be most effective in the practice of this invention and is the preferred embodiment. Certain of the other solvents have a deficiency in one or more of the other characteristics. For instance, the ketone is an excellent selective solvent that has a low flash point. The solvent stream of this invention contains at least about 2% of a tertiary alkyl amine with preferably from 3% to about 6%, with the most preferable range from about 2.5% to about 4% of the tertiary alkyl amine. The alkyl group on the amine may either be the same or different, but would have from 1 to about 12 carbon atoms in the chain, depending upon the selection of the amine. Preferably, trioetylamine is used and is readily available as a commercial product predominantly as the triaoctylamine, but containing some $C_{10}$ tertiary amine, ("ALAMINE 336"-Henkel Corporation). The temperature at which the contact is made is not critical except that, of course, it is preferred to carry the process out at ambient or slightly elevated temperatures, usually up to about 150° F. Normal ambient operating pressures are used and those developed by the pumps and the system are satisfactory.

The aqueous brine in line 56 and the solvent in line 58 join to create the mixture passing through line 60 where the brine and solvent containing tertiary amine are intimately mixed and extraction of the phenolic compounds and organic soluble compounds occur. For improvement of the mixing, line 60 could also include a static mixer, which for some brine streams being treated, may be sufficient. It is preferred in the practice of this invention to use the fiber bundle-type of contact device as will be specifically described later. The time of contact of the two streams is brief and the time sufficient for extraction may be readily determined by the skilled artisan. The solvent now containing the phenolics and soluble organic acids passes through line 60 to separation vessel 62 where the aqueous phase and solvent phase separate. The solvent phase, now containing the phenolics and soluble organic acids, exit the separator 62 overhead through line 64 and to the fiber bundle contactor C where the solvent containing the amines and phenolic compounds are deposited on the fibers of the bundle B and contacted by an aqueous caustic stream circulating through line 66 with makeup alkali metal hydroxide, preferably sodium hydroxide, being fed into the system through line 68.

The caustic streams herein utilized include, for example, aqueous potassium hydroxide solutions and aqueous sodium hydroxide solutions having concentration of from about 5% to about 50%, more preferably from about 5% to about 25%, still more preferably from about 10% to about 20%, by weight alkali hydroxide. The circulating caustics preferably has a concentration of about 6% by weight NaOH.

The contact of the solvent phase containing the phenolics with the caustic cause the phenolic compounds to once again become water soluble, this time in the form of sodium salts, and become part of the aqueous phase separated in vessel V to regenerate the trialkylamine, surprisingly, virtually without loss. The solvent containing the tertiary amine, being freed of the other organic values, now in the form of sodium salts, exits vessel V through line 70 for recycling to line 58 for further contact with the brine effluent from the springing step entering through line 56. Since the practice of this invention results in a minimum loss of the trialkylamine, there is no necessity for a constant makeup stream, as is required in connection with the alkaline metal hydroxide entering through line 68 and the sulfuric acid entering through line 80. It must be recognized, however, that a monitoring of the amine level in the solvent would be prudent such that a small amount may be added to the system as needed.

The caustic stream in vessel V, now containing the soluble sodium salts, exits through line 72, pump 74 through line 76 to form the caustic recycle steam 66, where it again is dispersed on the fiber bundle B to contact the solvent. A side stream of the caustic 78 is removed from line 76 where it is neutralized by a stream of sulfuric acid entering line 80 and thence to a separator 82 where an aqueous phase of brine, now safely disposable through ordinary waste treatment systems may be removed through line 84 to join an effluent stream 86 from separator 62 to form an aqueous brine stream suitable for environmentally benign disposal exiting the system through line 88.

The organic overhead stream exits separator 82 through line 90. This overhead stream contains acid oils which may be further processed in the refinery, returned to the crude oil feedstream to once again experience the hydrocarbon refining process, or may be suitably used as a fuel.

Thus, the general scheme of this process has been described. As mentioned previously, the effluent stream and the solvent stream come together for mixing extraction and separation. It has been found that for many such aqueous brines, mere mixing is not satisfactory to effect sufficient extraction of both the phenolic compounds and the other water soluble organic compounds which determine the chemical oxygen demand of the aqueous brine. Accordingly, it is a preferred embodiment to use a fiber bundle contactor to accomplish the extraction and mass transfer from the brine to the solvent.

Figure 2:
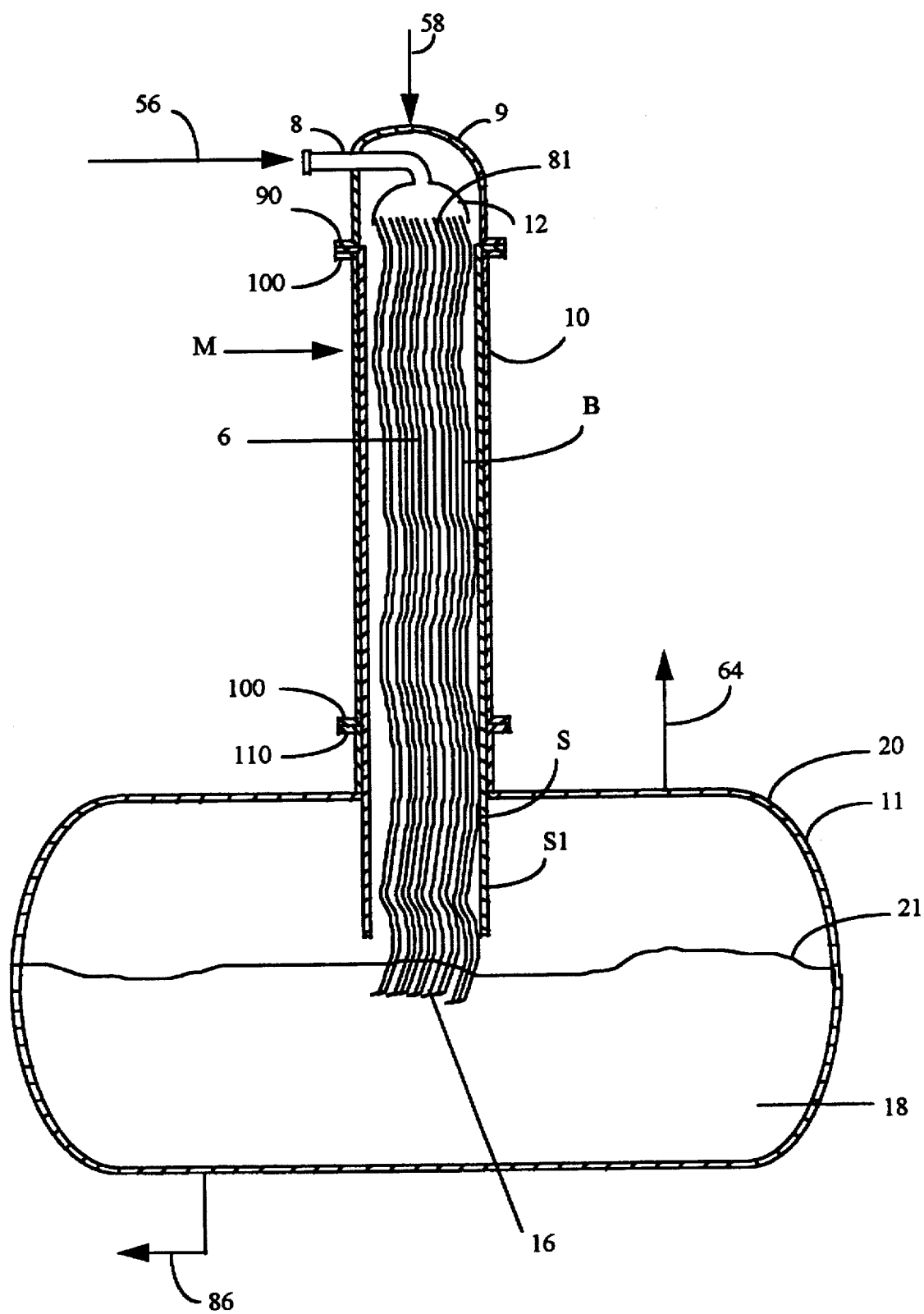
FIG. 2 illustrates a general schematic of the preferred embodiment of this invention wherein the aqueous stream is contacted by the solvent in a fiber bundle.

Referring now to FIG. 2, there is illustrated a general schematic of cocurrent liquid-liquid mass transfer apparatus useful in the practice of this invention. The apparatus of FIG. 2 makes use of the mass transfer techniques and apparatus as disclosed in U.S. Pat. Nos. 3,977,829 and 3,992,156, and reference may be made to such patents, incorporated herein by reference for all purposes, for a full description thereof. It should here be noted that the present invention is not to be limited by its use with the apparatus of FIG. 2.

The mass transfer apparatus M of FIG. 2 includes a bundle B of substantially continuous elongated fibers 6 mounted in a shroud S and contained within conduit 10. Conduit 10 is provided with an inlet flange 10a that is adapted for connection or placement with mounting flange 9a of conduit inlet assembly 9. A fluid distribution means 12 is mounted within conduit inlet assembly 9 for distributing the brine from line 56 (FIG. 1) to aqueous brine feed line 8 onto fibers 6 of fiber bundle B. A solvent feed line 58 (FIG. 1) is also attached to conduit inlet assembly 9 for delivering the solvent stream into conduit assembly 9.

Conduit 10 is also provided with an outlet flange 10b which is adapted for placement or connection with mounting flange 11a of collection vessel 11. Collection vessel 11, during the operation of mass transfer apparatus M, will contain a lower layer 18 of brine solution, with reduced phenolic compound content and diminished COD, and an upper layer 20 of solvent solution containing the trialkylamine and organics extracted from the brine, resulting from the processes of this invention. Shroud S and fibers 6 of fiber bundle B extend partly within the confines of collection vessel 11, with the positioning of the downstream end 16 of fiber bundle B within collection vessel 11 being such that downstream end 16 is within the aqueous brine collected as lower layer 18.

Fibers 6 that comprise fiber bundle B are selected to meet two criteria: (1) the fiber material must be preferentially wetted by the brine at a pH of about 2 to about 4 introduced by feed line 8; and (2) the fibers must be of a material that will not contaminate the process or be destroyed by it, such as by corrosion, preferably 316 grade stainless steel. Accordingly, inasmuch as the processes of this invention deal with acidic brine solutions and hydrocarbons, metallic fibers and, in particular, stainless steel or special corrosion resistant alloy fibers, are preferably employed.

A specific preferred embodiment of the invention utilizes the apparatus for FIG. 2 for "springing" of the napthenic acids from the aqueous refinery effluent through sulfuric acid treatment, the extraction of the water soluble organic compounds and the caustic separation of the phenols from the solvent.

To perform the extraction process of the invention, the brine stream containing the phenolic compounds and water soluble organic acids is flowed through brine feed line 8, into inlet assembly 9, to fluid distribution means 12 and onto the upstream end B1 of the fiber bundle B as illustrated in FIG. 2. Simultaneously, the solvent stream containing the trialkyamine in amounts previously mentioned, is flowed through hydrocarbon feed line 58, into inlet assembly 9, and then cocurrently with and in intimate connect with the brine stream, passing over fibers 6 of fiber bundle B contained within conduit 10, and then into collection vessel 11. During the time two immiscible fluids are in contact within conduit 10, the phenolic compounds and other organic acids contained in the brine stream are extracted into the solvent stream rendering the brine environmentally benign or sufficiently so to receive refinery waste water treatment.

As previously mentioned, fibers 6 must be preferentially wetted by the brine from line 56 stream introduced by feed line 8. Since, the volumetric flow ratio of the solvent stream to brine stream is less that about 1:1, phase inversion may occur resulting in fibers 6 being preferentially wetted by the solvent stream.

The above described invention will be more specifically explained by the following examples which are offered for purposes of illustration, rather than limitation, and should be construed as such. In the practice of these examples aqueous brine streams are used with the following analyses being exemplary of such brines prior to treatment in the practice of this invention.

| Feed Source | SOURCE TABLE Phenolic Compounds, ppm | COD, ppm |
|---|---|---|
| A | ≈2600 | 11,000 |
| B | ≈250 | 16,000–23,000 |
| C | ≈800 | — |
| D | ≈650 | — |
| E | ≈2650 | — |

EXAMPLE 1

A series of liquid-liquid extraction shake tests were done using a brine (pH 2) having about 2600 ppm phenolics to determine optimum conditions for adding TOA ("ALAMINE 336"-Henkel) into kerosene (a middle distillate cut) to remove phenolic compounds. Total phenolics content was reduced from 2600 ppm to <5 ppm in a single stage extraction with 5% TOA and 3:1, brine:solvent. Phenolics reduction as a function of % TOA in middle distillate and the brine:solvent ratio are summarized in Tables I and II. The data on these tables relating to the COD content of the treated brine is not representative of the results achievable since the phenolic content is so great in these tests. Phenolics removal increases with TOA content in the solvent, although the rate of increase falls off above 4% TOA. Reducing the brine:solvent ratio also improves phenolics removal, although the effect is less pronounced at high % TOA levels. Adding more sulfuric acid to the acidic brine to further reduce pH below 2 slightly improved phenolics removal, but removal from the existing brine is already adequate.

Improved phenolics removal is obtained from amine extractions at 75° F. rather that at the typical process temperature of 150° F. Slightly poorer performance was also seen in shake tests using liquid-full flasks, probably due to less vigorous extraction conditions, than in shake tests in ~75%-full flasks. Lab studies found similar effects of TOA, temperature, and liquid-full extractions using brines from Source A and B. Slight emulsions were seen in several instances using middle distillate both with and without added trioctylamine, particularly at slightly elevated (150° F.) temperatures. Lab studies at the optimum 3–4% TOA in middle distillate have not produced any emulsions, however.

TABLE I

Effect of % TOA and Solvent Ratio on PC Removal

| Brine*:Solvent | % TOA in MDST | PC, ppm (UV) | COD, ppm | Comments |
|---|---|---|---|---|
| 3:1 (v:v) | 0 | 1042 | 4502 | MDST alone |
| " | 1 | 589 | 6896 | emulsion formed |
| " | 2 | 148 | 7522 | emulsion formed |
| " | 3 | 98 | 6856 | |
| " | 4 | 35 | 4955 | |
| " | 5 | 3 | 5134 | |
| 5:1 (v:v) | 1 | 922 | 7582 | |
| " | 2 | 535 | 6567 | |
| " | 3 | 236 | 5194 | |
| " | 4 | 93 | 8149 | |
| " | 5 | 42 | 3881 | |

MDST = middle distillate cut

TABLE II

Extraction of Phenolics/COD from a Source "A" brine with Amines and Other Solvents

| Solvent | Brine:Solvent | Temp, °F. | PC, ppm | COD, ppm | Comments |
|---|---|---|---|---|---|
| MDST | 1:1 | 150 | 677 | 9063 | emulsion |
| MDST | 2:1 | 150 | 331 | 11299 | emulsion |
| MDST | 3:1 | 150 | 950 | NA | sl. emulsion |
| MDST | 3:1 | 75 | 1042 | 4502 | sl. emulsion |
| 4% TOA in MDST | 3:1 | 75 | 20 | 7343 | |
| 4% TOA in MDST | 3:1 | 75 | 3 | 4179 | $+H_2SO_4$ |
| 4% TOA in MDST | 3:1 | 75 | 31 | 3253 | |
| 4% TOA in MDST | 3:1 | 150 | 88 | 5438 | |
| 3% TOA in MDST | 3:1 | 75 | 7 | NA | Liquid-full |
| 3% TOA in MDST | 3:1 | 75 | 253 | NA | |
| 2% TOA in MDST | 3:1 | 150 | 436 | 5075 | |
| HISOL 15 | 1:1 | 75 | 268 | 4328 | |
| HISOL 15 | 1:5 | 75 | 72 | 13263 | |
| i-Decanol | 1:5 | 75 | 13 | 7764 | |
| i-Decanol | 5:1 | 75 | 111 | 5196 | |
| 10% i-Decanol in MDST | 3:1 | 75 | 313 | 2840 | |
| DIBK | 5:1 | 75 | 3 | 3233 | |
| 5% in DIBK in MDST | 5:1 | 75 | 903 | 7522 | |
| 10% DIBK in MDST | 5:1 | 75 | 699 | 6806 | |
| 25% DIBK in MDST | 5:1 | 75 | 346 | 5552 | |
| 10% DIBK in kerosene | 3:1 | 75 | 641 | 8507 | |
| 25% DIBK in kerosene | 5:1 | 75 | 453 | 4320 | |

MDST = middle distillate cut
"HISOL 15" = aromatic solvent ($C_3$ & $C_4$ alkyl benzenes)
DIBK = di-isobutyl ketone In cases where mass balances were 100±10%, the estimated distribution coefficient for total phenolics extracted by 4% TOA in kerosene was 134, compared to 205 for DIBK, 87 for isodecanol, and 8 for "HISOL 15".

EXAMPLE 2

Various aqueous brines from a naphthenic acid springing unit where being treated in a solvent extraction unit operating with 6,000 gallons of middle distillate cut (MDST) to remove phenolics and reduce COD. A 3% TOA (Henkel's "ALAMINE 336" trioctylamine) solution in the solvent was created and the various brines from different sources were treated as described in connection with FIG. 1 above. The solvent and amine was regenerated using a 6% NaOH solution at a ratio of 10–15:1, solvent:caustic ratio without loss of the amine. The brine was treated at the temperature from which it emerged from the naphthenic acid springing unit with conditions of about 150° F., a pH of between 2 and 2.5, and at flow rates such that the ratio of brine:solvent was maintained at from about 3:1 to 4:1. The brine flow rate was about 40 to 65 gallons per minute with the solvent flow rate of from 12 to 23 gallons per minute. The solvent containing the trioctylamine and the removed materials then is run through a caustic regeneration unit where the phenolics are removed and the middle distillate cut recycled to the extraction unit. Over the period of time of several months when the solvent was no longer usable, the trioctylamine concentration remained substantially the same with no loss of amines.

Table III shows representative results from the run periods, some of which were about 60 hours depending upon the volume of brine available.

| BRINE SOURCE | PHENOLIC, ppm In | PHENOLIC, ppm Out | COD, ppm In | COD, ppm Out |
|---|---|---|---|---|
| A | 1,100 | 404 | 11,000 | 3,500 |
| B | 600 | 200 | 16,000 | 9,400[1] |

-continued

Table III shows representative results from the run periods, some of which were about 60 hours depending upon the volume of brine available.

| BRINE SOURCE | PHENOLIC, ppm In | PHENOLIC, ppm Out | COD, ppm In | COD, ppm Out |
|---|---|---|---|---|
| C | 793 | 265 | | |
| D | 632 | 319 | | |
| E | 2,650 | 913 | | |

[1] with MDST alone extraction COD was 16,500

The typical phenolics removal from the brine prior to adding the amine to the solvent was about 40%. The phenolics removal increased to the 60–65% range with the TOA present, an increase of about 50%. COD levels dropped dramatically as well as the PC levels as seen from the treatments of brine from Sources A and B. The percent amine remained approximately 3% throughout the runs summarized in this example. The COD values for brine from Sources C, D and E are not significant in terms of creating an environmentally dischargeable brine for these source materials.

EXAMPLE 3

Using the shake test method described in Example 1, which is well known to those skilled in the art, some brine from Source B was tested for removal of the COD using various solvent combinations. These results are reported in Table IV, attached.

TABLE IV

Solvent Extraction for Reduction of COD in Brine from Source "B"

| Solvent | Brine pH | Brine:Solvent (v:v) | Feed COD, ppm | 1st stage COD, ppm | 2nd stage COD, ppm |
|---|---|---|---|---|---|
| 18% TOA/ Xylene[1] | 2 | 4:1 | 24500 | 2500 | NA |
| 18% TOA/ Xylene | 7 | 4:1 | 25500 | 17700 | 16500 |
| 4% TOA/ MDST | 2 | 3:1 | 10300 | 1100 | NA |
| 14% DAMA/ Xylene[2] | 2 | 4:1 | 24500 | 2700 | 1800 |
| 14% ADMA/ Xylene[3] | 2 | 4:1 | 24500 | Emulsion | NA |
| Xylene | 2 | 4:1 | 24500 | 23700 | NA |
| Freon TF | 2 | 4:1 | 11900 | NA | 10400 |
| MIBK | 7 | 10:1 | 15000 | 12700 | NA |
| MDST | 2 | 3:1 | 16000 | 16400 | NA |

[1]TOA = ALAMINE 336, trioctylamine + dioctyldecylamine, a–$C_{26}$ tertiary amine (Henkel).
[2]DAMA 1010 = didecylmethylamine, a $C_{21}$ tertiary amine (Ethyl).
[3]ADMA 18 = Octadecyldimethylamine, a $C_{20}$ tertiary amine (Ethyl).

Note the dramatic results achieved with 4% by weight trioctylamine in middle distillate, as well as 18% trioctylamine in xylene, an aromatic solvent. In both instances, approximately 90% removal occurred in the first stage of separation.

Having described this invention in detail above, those skilled in the art would readily be able to make many modifications and alterations to the foregoing invention without departing from the scope of the appended claims.

What is claimed:

1. A process for treating an aqueous refinery waste stream containing phenolic compounds and high chemical oxygen demand to reduce levels of phenolic compounds and chemical oxygen demand and render the aqueous stream susceptible to environmentally benign disposal, comprising the steps of:

contacting the aqueous waste stream at a ratio of from 2 parts to about 10 parts of aqueous waste stream per part by volume of a solvent solution containing at least about 2% of a tertiary alkyl amine, wherein such alkyl group has from 1 to about 12 carbon atoms at a pH of up to about 4 to extract phenols and organic sulfonic acids from the aqueous phase into the solvent phase;

separating the aqueous phase from the solvent phase;

acidifying the aqueous phase to separate organic oils from the aqueous phase and recovering such oils and disposing of the aqueous phase now having substantially lowered phenolic content and chemical oxygen demand.

2. The process of claim 1, wherein the tertiary alkyl amine is trioctylamine.

3. The process of claim 2, wherein the trioctylamine is present in an amount of from 2% to 5% by weight.

4. The process of claim 1 which includes, after separating the aqueous phase from the solvent phase, the step of contacting the solvent phase with caustic to extract the phenolics and organic sulfuric acids to regenerate the solvent and amine and form an aqueous caustic phase; and acidifying the caustic phase to separate the phenolics and organic sulfuric acids from the caustic.

5. The process of claim 1, wherein the pH is from about 2 to about 4.

6. An improved process for recovering phenolic compounds and water soluble organic acids from an aqueous caustic refinery effluent which comprises the steps of:

contacting the effluent, at a pH of from about 2 to about 4, in the presence of a fiber bundle with an organic hydrocarbon solvent containing at least about 1% of a tertiary alkyl amine, wherein the alkyl group has from 1 to about 12 carbon atoms at a ratio of 1 part by volume solvent to about 3 to about 6 parts of the brine to create an aqueous phase substantially free of phenols and organic sulfonic acids and a solvent phase containing such phenols and sulfonic acids;

contacting the solvent phase in the presence of a fiber bundle with an alkali metal hydroxide solution to create an aqueous phase of alkali metal salts of such phenols and organic acids and a solvent phase including the amine and solvent; and neutralizing the aqueous phase with an add to create an oil phase and an aqueous phase suitable for benign disposal to the environment; and recovering said oil phase.

7. The process of claim 6, wherein the alkali metal hydroxide is sodium hydroxide.

* * * * *

UNITED STATES PATENT AND TRADEMARK OFFICE
CERTIFICATE OF CORRECTION

PATENT NO. : 5,705,074
DATED : January 6, 1998
INVENTOR(S) : James A. Brient

It is certified that error appears in the above-identified patent and that said Letters Patent is hereby corrected as shown below:

Col. 1, Line 49 - reads "publication falls", change to -- publication fails --

Col. 3, Line 55/56 -- reads "trioetylamine", change to -- trioctylamine --

Col. 3, Line 57 -- reads "triaoctylamine", change to -- trioctylamine --

Col. 8, Line 66 -- reads "throughout the rims", change to -- throughout the runs --

Col. 10, Line 19 - reads "sulfuric acids", change to -- sulfonic acids--

Col. 10, Line 22 - reads "sulfuric acids", change to -- sulfonic acids --

Col. 10, Line 42 - reads "with an add", change to -- with an acid --

Signed and Sealed this

Thirty-first Day of March, 1998

Attest:

BRUCE LEHMAN

Attesting Officer

Commissioner of Patents and Trademarks